US010984710B2

(12) United States Patent
Sun et al.

(10) Patent No.: US 10,984,710 B2
(45) Date of Patent: Apr. 20, 2021

(54) METHOD FOR SENDING DRIVING DATA OF BACKLIGHT SOURCE, CONTROL CIRCUIT AND DISPLAY DEVICE

(71) Applicants: Beijing BOE Optoelectronics Technology Co., Ltd., Beijing (CN); BOE Technology Group Co., Ltd., Beijing (CN)

(72) Inventors: Binhua Sun, Beijing (CN); Jian Sun, Beijing (CN); Lin Lin, Beijing (CN); Feng Zi, Beijing (CN); Yakun Wang, Beijing (CN); Jiyang Shao, Beijing (CN); Xinjian Liu, Beijing (CN); Ziqiang Guo, Beijing (CN); Yadong Ding, Beijing (CN); Bingxin Liu, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/736,883

(22) Filed: Jan. 8, 2020

(65) Prior Publication Data

US 2020/0302862 A1 Sep. 24, 2020

(30) Foreign Application Priority Data

Mar. 21, 2019 (CN) ........................ 201910216687.5

(51) Int. Cl.
*G09G 3/36* (2006.01)
*G06F 3/038* (2013.01)
(Continued)

(52) U.S. Cl.
CPC ......... *G09G 3/3225* (2013.01); *G09G 3/3266* (2013.01); *G09G 3/3275* (2013.01); *G09G 3/3614* (2013.01); *G09G 2320/0626* (2013.01)

(58) Field of Classification Search
CPC ........................... G09G 3/3426; G09G 3/3413
See application file for complete search history.

(56) References Cited

U.S. PATENT DOCUMENTS

2012/0075274 A1* 3/2012 Ueno .................. G09G 3/3426 345/207
2014/0252984 A1* 9/2014 Zhang .................... H05B 45/46 315/294
2017/0013115 A1* 1/2017 Kong ................. G06F 3/04842

FOREIGN PATENT DOCUMENTS

CN 101674318 A 3/2010
CN 104917731 A 9/2015
(Continued)

OTHER PUBLICATIONS

First office action of Chinese application No. 201910216687.5 dated Mar. 10, 2020.
(Continued)

*Primary Examiner* — Nan-Ying Yang
(74) *Attorney, Agent, or Firm* — Fay Sharpe LLP

(57) ABSTRACT

The present disclosure provides a method for sending driving data of a backlight source, a control circuit and a display device. The method includes: acquiring driving data of a plurality of rows of light-emitting elements included in the backlight source; and sending the driving data of the plurality of rows of light-emitting elements to a driving circuit of the backlight source at many times, wherein at least one data packet is sent each time, each data packet includes driving data for driving one row of light-emitting elements
(Continued)

and a quantity of data packets sent each time is less than a quantity of rows of light-emitting elements included in the backlight source.

20 Claims, 9 Drawing Sheets

(51) Int. Cl.

| | |
|---|---|
| ***G09G 5/00*** | (2006.01) |
| ***G09G 3/3225*** | (2016.01) |
| ***G09G 3/3266*** | (2016.01) |
| ***G09G 3/3275*** | (2016.01) |

(56) References Cited

FOREIGN PATENT DOCUMENTS

| | | | |
|---|---|---|---|
| CN | 105321480 | A | 2/2016 |
| CN | 106782378 | A | 5/2017 |
| EP | 1100235 | B1 | 3/2006 |

OTHER PUBLICATIONS

Quan Jiang, Flat Panel Display Drive Technology, Aug. 31, 2014; pp. 196-209.

* cited by examiner

METHOD FOR SENDING DRIVING DATA OF BACKLIGHT SOURCE, CONTROL CIRCUIT AND DISPLAY DEVICE

This application claims priority to Chinese Patent Application No. 201910216687.5, filed on Mar. 21, 2019 and entitled "METHOD FOR DRIVING BACKLIGHT SOURCE, CONTROL CIRCUIT AND DISPLAY DEVICE", the entire contents of which are incorporated herein by reference.

TECHNICAL FIELD

The present disclosure relates to the field of display technologies, and in particular, to a method for sending driving data of a backlight source, a control circuit and a display device.

BACKGROUND

A liquid crystal display (LCD) device may include a liquid crystal display panel, and a backlight source which provides a light source for the liquid crystal display panel. The backlight source may include a plurality of light-emitting diodes (LEDs) arranged in an array.

In the related art, the liquid crystal display device may further include a control circuit and a driving circuit of the backlight source. The driving circuit of the backlight source is connected to each light-emitting diode in the backlight source. The control circuit may process grayscale data of an image to be displayed to obtain driving data of each LED, and may send the driving data of all LEDs included in the backlight source to the driving circuit of the backlight source. The driving circuit of the backlight source may drive row by row, according to the received driving data of the plurality of LEDs and on the basis of a scanning direction of various rows of pixels in the liquid crystal display panel, the plurality of LEDs to emit light, such that the various rows of pixels in the liquid crystal display panel and the LEDs are updated synchronously.

SUMMARY

Embodiments of the present disclosure provide a method for sending driving data of a backlight source, a control circuit and a display device. The technical solutions are as follows.

In one aspect, a method for sending driving data of a backlight source is provided. The backlight source includes a plurality of rows of light-emitting elements. The method includes:

acquiring driving data of the plurality of rows of light-emitting elements; and sending the driving data of the plurality of rows of light-emitting elements to a driving circuit of the backlight source at many times;

wherein at least one data packet is sent each time, each of the at least one data packet includes driving data for driving one row of light-emitting elements, and a quantity of data packets sent each time is less than a quantity of rows of light-emitting elements included in the backlight source.

Optionally, each row of light-emitting elements is configured to provide backlight for at least one row of pixels in a plurality of rows of pixels included in a display panel; and sending the driving data of the plurality of rows of light-emitting elements to the driving circuit of the backlight source at many times includes:

sending the driving data of the plurality of rows of light-emitting elements to the driving circuit of the backlight source at many times according to a scanning direction of the plurality of rows of pixels;

wherein the at least one data packet sent each time is for use by the driving circuit of the backlight source to drive row by row at least one row of light-emitting elements to emit light.

Optionally, each of the at least one data packet further includes a row identifier of the one row of light-emitting elements, and the driving data for driving one row of light-emitting elements includes light-emitting duration data of each light-emitting element in the one row of light-emitting elements; and each of the at least one data packet is intended to instruct the driving circuit of the backlight source to drive one row of light-emitting elements, indicated by the row identifier, to emit light, and control a light-emitting duration of the light-emitting element according to the light-emitting duration data of each of the light-emitting elements.

Optionally, the control circuit sends M data packets each time, M being an integer greater than 1; and the method further includes:

sending a driving sequence instruction to the driving circuit of the backlight source;

wherein the driving sequence instruction carries a driving sequence of M rows of light-emitting elements driven through use of the M data packets, and is intended to instruct the driving circuit of the backlight source to drive row by row, according to the driving sequence, the M rows of light-emitting elements to emit light.

Optionally, one data packet is sent each time.

Optionally, acquiring the driving data of the plurality of rows of light-emitting elements includes:

receiving grayscale data of an image to be displayed which is sent by an image processing circuit; and processing the grayscale data to obtain driving data of each row of light-emitting elements in the plurality of rows of light-emitting elements.

Optionally, prior to receiving the grayscale data of the image to be displayed which is sent by the image processing circuit, the method further includes:

receiving a first synchronization signal sent by the image processing circuit; and sending the driving data of the plurality of rows of light-emitting elements to a driving circuit of the backlight source at many times includes:

upon receipt of the first synchronization signal and delay for a buffer duration, sending the driving data of the plurality of rows of light-emitting elements to the driving circuit of the backlight source at many times;

wherein the buffer duration is greater than or equal to a duration of a time period from the time when the image processing circuit sends the first synchronization signal to the time when liquid crystals are reversed to be in a stable state when the display panel displays the image to be displayed.

Optionally, each row of light-emitting elements is configured to provide backlight for at least one row of pixels in a plurality of rows of pixels included in a display panel; and after the at least one data packet is sent each time, the method further includes:

receiving a second synchronization signal which is sent by a scanning driving circuit of the display panel at an interval of a scanning duration, wherein the scanning duration is a duration required for the scanning driving circuit to scan the at least one row of pixels; and upon receipt of the second synchronization signal each time, sending a third synchronization signal to the driving circuit of the backlight source, wherein the third synchronization signal is intended to instruct the driving circuit of the backlight source to drive one row of light-emitting elements to emit light.

In another aspect, a control circuit is provided. The control circuit includes:

an acquiring module, configured to acquire driving data of a plurality of rows of light-emitting elements included in a backlight source; and a first sending module, configured to send the driving data of the plurality of rows of light-emitting elements to a driving circuit of the backlight source at many times;

wherein at least one data packet is sent each time, each of the at least one data packet includes driving data for driving one row of light-emitting elements, and a quantity of data packets sent each time is less than a quantity of rows of light-emitting elements included in the backlight source.

Optionally, each row of light-emitting elements is configured to provide backlight for at least one row of pixels in a plurality of rows of pixels included in a display panel; and the first sending module is further configured to send the driving data of the plurality of rows of light-emitting elements to the driving circuit of the backlight source at many times according to a scanning direction of the plurality of rows of pixels;

wherein the at least one data packet sent each time is intended to instruct the driving circuit of the backlight source to drive row by row at least one row of light-emitting elements to emit light.

Optionally, the first sending module sends M data packets each time and M is an integer greater than 1; and the control circuit further includes:

a second sending module, configured to send a driving sequence instruction to the driving circuit of the backlight source;

wherein the driving sequence instruction carries a driving sequence of M rows of light-emitting elements driven through use of the M data packets, and is intended to instruct the driving circuit of the backlight source to drive row by row, according to the driving sequence, the M rows of light-emitting elements to emit light.

Optionally, the acquiring module includes:

a receiving sub-module, configured to receive grayscale data of an image to be displayed which is sent by an image processing circuit; and a processing sub-module, configured to process the grayscale data to obtain driving data of each row of light-emitting elements.

Optionally, the receiving sub-module is further configured to receive a first synchronization signal sent by the image processing circuit;

the first sending module is configured to:

upon receipt of the first synchronization signal and delay for a buffer duration, send the driving data of the plurality of rows of light-emitting elements to the driving circuit of the backlight source at many time;

wherein the buffer duration is a duration of a time period from the time when the image processing circuit sends the first synchronization signal to the time when liquid crystals are reversed to be in a stable state when the display panel displays the image to be displayed.

Optionally, each row of light-emitting elements is configured to provide backlight for at least one row of pixels in a plurality of rows of pixels included in a display panel; and the control circuit further includes:

a receiving module, configured to receive a second synchronization signal which is sent by a scanning driving circuit of the display panel at an interval of a scanning duration after the at least one data packet is sent each time, wherein the scanning duration is a duration required for the scanning driving circuit to scan the at least one row of pixels; and a third sending module, configured to send a third synchronization signal to the driving circuit of the backlight source, wherein the third synchronization signal is intended to instruct the driving circuit of the backlight source to drive one row of light-emitting elements to emit light.

In still another aspect, a driving device of a backlight source is provided. The driving device includes a memory, a processor and a computer program stored on the memory, wherein when executing the computer program, the processor perform the method for sending the driving data of the backlight source according to the above aspect.

In yet still another aspect, a computer-readable storage medium having at least one instruction stored therein is provided. When running on a computer, the computer-readable storage medium causes the computer to perform the method for sending the driving data of the backlight source according to the above aspect.

In yet still another aspect, a display device is provided. The display device includes a backlight source, a driving circuit of the backlight source, and a control circuit according to the above aspect.

Optionally, the display device is a virtual reality display device or an augmented reality display device.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

The present disclosure is described in further detail hereinafter with reference to the accompanying drawings, to present the objects, technical solutions, and advantages of the present disclosure more clearly.

Figure 1:
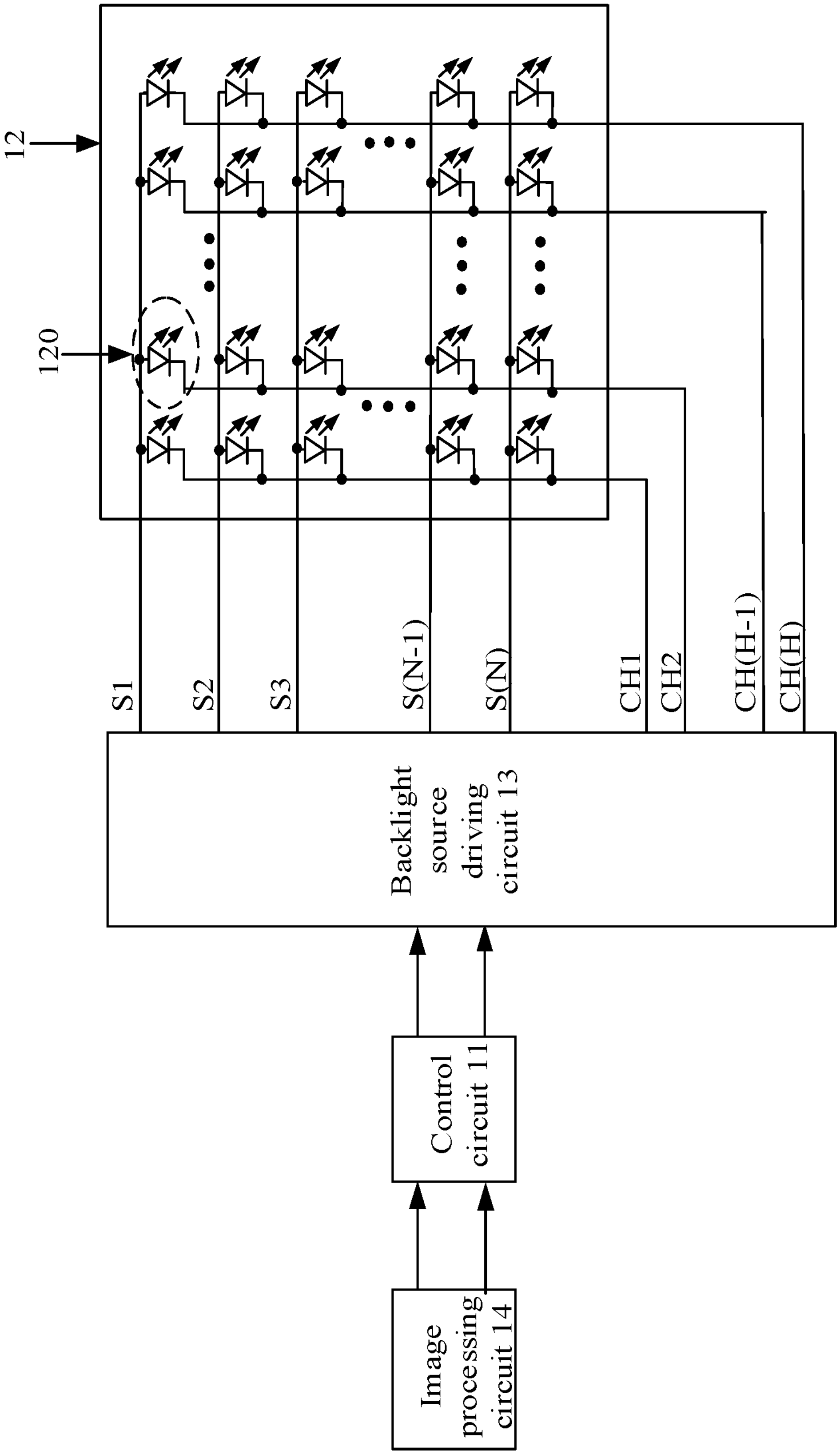
FIG. 1 is a structural diagram of a display device according to an embodiment of the present disclosure.

FIG. 1 is a structural diagram of a display device according to an embodiment of the present disclosure. As shown in FIG. 1, the display device may include a control circuit 11, a backlight source 12 and a driving circuit 13 of the backlight source 12. The driving circuit 13 of the backlight source 12 may also be called a backlight source driving circuit. The backlight source 12 may be a direct-type backlight source. With reference to FIG. 1, the backlight source 12 may include a plurality of rows of light-emitting elements 120. Each row of light-emitting elements 120 may include at least one light-emitting element 120, and each light-emitting element 120 may be an LED. The quantities of light-emitting elements 120 included in any two rows of light-emitting elements may be the same or different. The backlight source driving circuit 13 is connected to the control circuit 11 and each light-emitting element 120, and is configured to drive, based on driving data provided by the control circuit 11, the light-emitting element 120 to emit light.

Optionally, with reference to FIG. 1, the backlight source 12 may include N rows and H columns of light-emitting elements 120, wherein both N and H are integers greater than 1, and N and H may be equal or unequal. For example, H may satisfy the equation: $H=\lfloor N/2 \rfloor$, the symbol "$\lfloor\ \rfloor$" represents rounding down. As shown in FIG. 1, the backlight source driving circuit 13 may be connected to the N rows of light-emitting elements 120 through N switching signal lines S1-SN in a one-to-one corresponding fashion. Each switching signal line is connected to one electrode of each light-emitting element 120 in one corresponding row of light-emitting elements 120.

In addition, the backlight source driving circuit 13 may be connected to the H columns of light-emitting elements 120 through H current channel wires CH1-CH (H) in a one-to-one corresponding fashion. Each current channel wire is connected to the other electrode of each light-emitting element 120 in one corresponding column of light-emitting elements 120. The backlight source driving circuit 13 may provide a driving voltage for one corresponding row of light-emitting elements 120 through each switching signal line, and control, through each current channel wire, a conduction duration of a current output channel of each light-emitting element 120 in one column of light-emitting elements, thereby controlling a light-emitting duration of each light-emitting element 120 in one row of light-emitting elements.

Exemplarily, it is assumed that the light-emitting element is an LED, each switching signal line may be connected to an anode of the LED and each current channel wire may be connected to a cathode of the LED.

As shown in FIG. 1, in the related art, the control circuit 11 needs to send the driving data of all light-emitting elements 120 to the backlight source driving circuit 13 at a time, such that the backlight source driving circuit 13 drives row by row the plurality of rows of light-emitting elements 120 to emit light upon receipt of the driving data of all the light-emitting elements 120. Since the data amount of the driving data sent by the control circuit 11 to the backlight source driving circuit 13 is relatively larger, if the transmission rate of a communication interface of the control circuit 11 is relatively lower, the duration required for the backlight source driving circuit 13 to receive all the driving data may be longer, which causes a relatively larger delay when the backlight source driving circuit 13 drives the plurality of light-emitting elements 120. As a result, backlight may not be punctually provided for an image displayed on the display panel, which affects the display effect of the liquid crystal display device.

Figure 2:
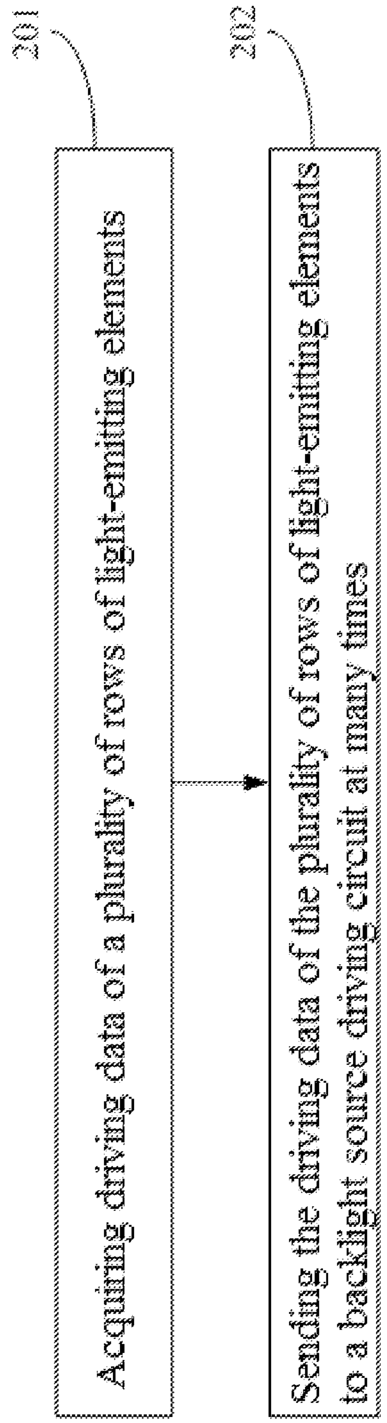
FIG. 2 is a flowchart of a method for sending driving data of a backlight source according to an embodiment of the present disclosure.

FIG. 2 is a flowchart of a method for sending driving data of a backlight source according to an embodiment of the present disclosure. The method for sending the driving data of the backlight source may be applied to the control circuit 11 of the display device shown in FIG. 1. As shown in FIG. 2, the method may include the following steps.

In step 201, driving data of a plurality of rows of light-emitting elements is acquired.

The driving data may be sent to the control circuit by an image processing circuit.

In step 202, the driving data of the plurality of rows of light-emitting elements is sent to a backlight source driving circuit at many times.

The control circuit sends at least one data packet each time. Each data packet may include driving data for driving one row of light-emitting elements, and a quantity of data packets sent each time is less than a quantity of rows of light-emitting elements included in the backlight source. The at least one data packet is intended to instruct the backlight source driving circuit to drive row by row at least one row of light-emitting elements to emit light. That is, the at least one data packet is in one-to-one correspondence with the at least one row of light-emitting elements.

In summary, in the method for sending the driving data of the backlight source according to the embodiment of the present disclosure, since the control circuit may send the data to the backlight source driving circuit at many times and the quantity of data packets sent each time is less than the quantity of rows of light-emitting elements included in the backlight source, the amount of data that is sent to the backlight source driving circuit by the control circuit each time is reduced. Thus, the backlight source driving circuit may firstly drive part of light-emitting elements according to the data packets received each time, thereby reducing the delay when the backlight source driving circuit drives the plurality of light-emitting elements, and ensuring the display effect of the display device.

As shown in FIG. 1, the display device according to the embodiment of the present disclosure may further include a display panel (not shown in FIG. 1) and an image processing circuit 14. The display panel may be a liquid crystal display panel. The image processing circuit 14 is connected to the control circuit 11, and is configured to process (such as render) an image to be displayed to obtain grayscale data of the image to be displayed, and send the grayscale data of the image to be displayed to the control circuit 11. Exemplarily, the image processing circuit may be a graphics processing unit (GPU).

Figure 3:
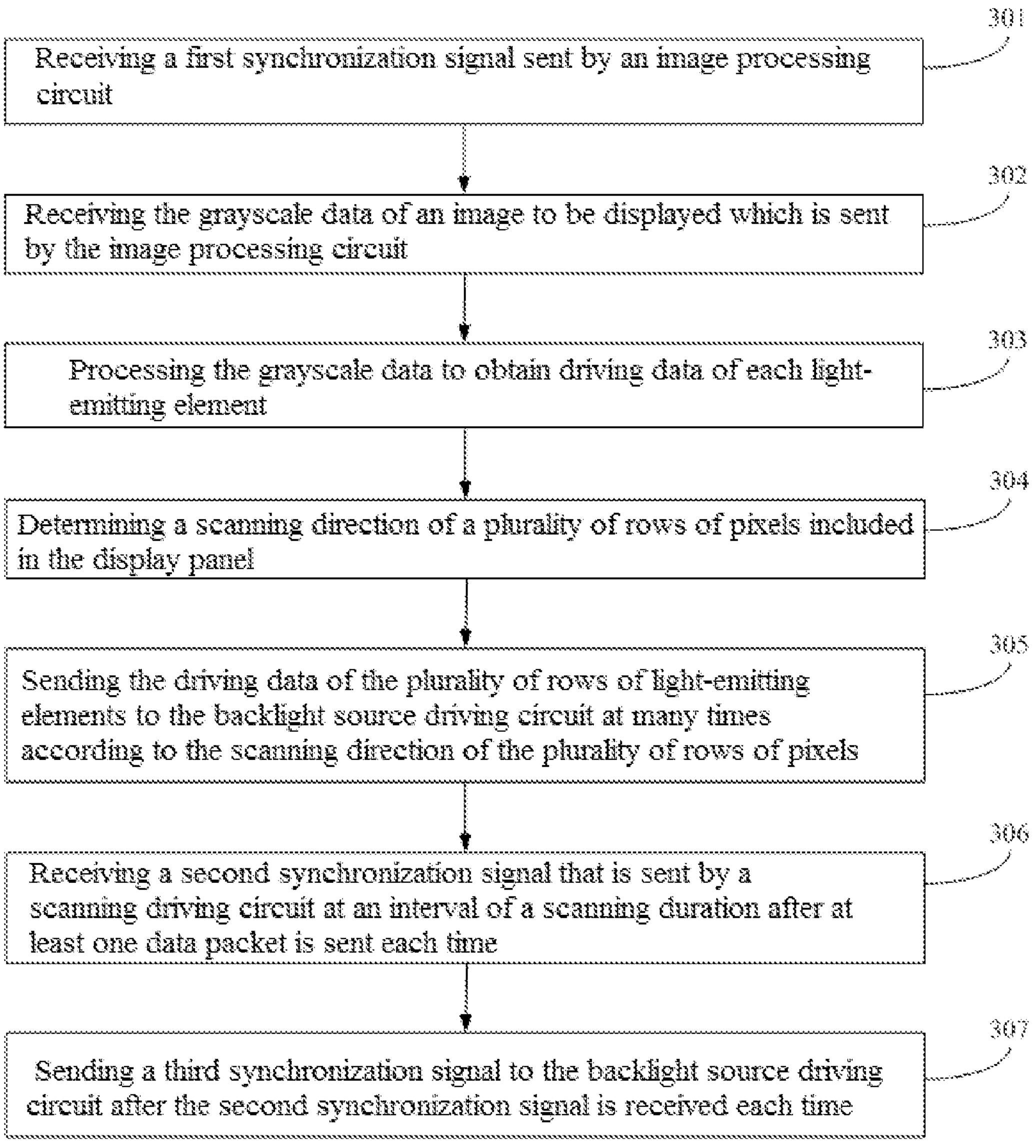
FIG. 3 is a flowchart of another method for sending driving data of a backlight source according to an embodiment of the present disclosure.

FIG. 3 is a flowchart of another method for sending driving data of a backlight source according to an embodiment of the present disclosure. The method for sending the driving data of the backlight source may be applied to the control circuit 11 of the display device shown in FIG. 1. As shown in FIG. 3, the method may include the following steps.

In step 301, a first synchronization signal sent by an image processing circuit is received.

In the embodiment of the present disclosure, after the display device is powered on and system initialization is completed, the image processing circuit may start to process each frame image to be displayed to obtain grayscale data of each frame image to be displayed, and send the grayscale data of each frame image to be displayed to the control circuit 11. The grayscale data of the image to be displayed may include a grayscale value of each pixel in the image to be displayed. In addition, the image processing circuit may send the first synchronization signal to the control circuit prior to sending each time the grayscale data of one frame image to be displayed, and the control circuit may receive the first synchronization signal.

In step 302, the grayscale data of an image to be displayed which is sent by the image processing circuit is received.

After sending the first synchronization signal to the control circuit, the image processing circuit may continue to send, to the control circuit, grayscale data of an image to be displayed. Correspondingly, upon receipt of the first synchronization signal sent by the image processing circuit, the control circuit may start to receive the grayscale data of the image to be displayed which is sent by the image processing circuit.

Since a quantity of pixels included in the image to be displayed is generally far greater than a quantity of light-emitting elements included in the backlight source, the image processing circuit needs to divide the image to be displayed into a plurality of partitions according to the quantity of light-emitting elements included in the backlight source and positions of various light-emitting elements. Each partition includes a plurality of pixels and each partition corresponds to one light-emitting element. Each light-emitting element may provide backlight for a plurality of pixels of one corresponding partition, and an orthographic projection of each light-emitting element on the display panel is located in a region where one corresponding partition is located. Subsequently, the image processing circuit may acquire, through an image processing algorithm, grayscale data of each partition in the image to be displayed, and send, to the control circuit, the grayscale data of each partition in the image to be displayed. The grayscale data of each partition may be a mean value or a median value of grayscale values of all pixels in this partition. The mean value may be an arithmetic mean value, a geometric mean value or a root-mean-square mean value.

Optionally, the light-emitting elements included in the backlight source may be arranged in an array. The image processing circuit may pre-store a quantity of rows and a quantity of columns of light-emitting elements included in the backlight source, and performs, according to the quantity of rows and the quantity of columns, partition division on the image to be displayed.

For example, if the backlight source includes N×H light-emitting elements, the image processing circuit needs to divide the image to displayed into N×H partitions; acquires, according to the image processing algorithm, the grayscale data of the N×H partitions in the image to displayed; and then sends the grayscale data of the N×H partitions to the control circuit.

In the embodiment of the present disclosure, if the display device is a virtual reality (VR) display device or an augmented reality (AR) display device, the image to be displayed may be obtained by the image processing circuit through the following steps: based on current user's posture and position information and a user's field angle, acquiring scenario data to be rendered, and rendering a target pixel point in a pre-stored image template according to the obtained scenario data.

In step 303, the grayscale data is processed to obtain driving data of each light-emitting element.

In the embodiment of the present disclosure, the control circuit may parse and process the received grayscale data of each partition according to a pre-set data processing algorithm so as to obtain driving data of one light-emitting element corresponding to each partition. The driving data may include light-emitting duration data of the light-emitting element. The light-emitting duration data indicates a light-emitting duration of the light-emitting element. In addition, the larger the value of the grayscale data is, the longer the light-emitting duration indicated by the light-emitting duration data generated based on the grayscale data is.

In step 304, a scanning direction of a plurality of rows of pixels included in the display panel is determined.

The display panel may include a plurality of rows of pixels, each row of light-emitting elements corresponds to at least one row of pixels, and each row of light-emitting elements may backlight for at least one row of pixels. It can be seen based on the above analysis that each light-emitting element may correspond to one partition. Therefore, the at least one row of pixels corresponding to each row of light-emitting elements may be understood as pixels included in at least one partition corresponding to at least one light-emitting element in this row of light-emitting elements.

The control circuit may pre-store a scanning direction of the plurality of rows of pixels. The scanning direction may be forward scanning, reverse scanning, or bidirectional scanning with the center as a starting point. The forward scanning may refer to scanning row by row from the first row of pixels of the display panel to the last row of pixels. The reverse scanning may refer to scanning row by row from the last row of pixels to the first row of pixels. The bidirectional scanning with the center as a starting point may refer to scanning from the middle row of pixels of a plurality of rows of pixels to the direction close to the first row of pixels and the direction close to the last row of pixels at the same time.

It should be noted that for different display devices, the scanning directions of a plurality of rows of pixels included in display panels of the different display devices may be the same or different.

In step 305, the driving data of the plurality of rows of light-emitting elements is sent to the backlight source driving circuit at many times according to the scanning direction of the plurality of rows of pixels.

In the embodiment of the present disclosure, the control circuit may determine a sending order of the driving data of the plurality of rows of light-emitting elements according to a corresponding relationship between each row of light-emitting elements and the pixel row and the scanning direction of the plurality of rows of pixels, and thus send the driving data of the plurality of rows of light-emitting elements to the backlight source driving circuit at many times according to the sending order.

The control circuit may send at least one data packet each time, each data packet includes driving data for driving one row of light-emitting elements, and the quantity of data packets sent each time is less than the quantity of rows of light-emitting elements included in the backlight source. The at least one data packet sent by the control circuit each time may be used by the backlight source driving circuit to drive row by row the at least one row of light-emitting elements to emit light.

Optionally, upon receipt of the first synchronization signal and delay for a buffer duration, the control circuit may send the driving data of the plurality of rows of light-emitting elements to the backlight source driving circuit at many times according to the scanning direction of the plurality of pixels. The buffer duration may be greater than or equal to a duration of a time period from the time when the image processing circuit sends the first synchronization signal to the time when liquid crystals are reversed to be in a stable state when the display panel displays the image to be displayed.

In the embodiment of the present disclosure, the control circuit 11 may further include a timer. The control circuit may start the timer for time counting upon receipt of the first synchronization signal sent by the image processing circuit. The time-counting duration of the timer is the buffer duration. After starting the timer, the control circuit 11 may receive the grayscale data of the image to be displayed which is sent by the image processing circuit, and parses the received grayscale data. Hereafter, after the parsing of the received grayscale data is completed, the control circuit obtains the driving data of the plurality of rows of light-emitting elements, and may send the driving data of the plurality of rows of light-emitting elements to the backlight source driving circuit at many times after detecting that time counting by the timer is ended.

Since the control circuit sends the driving data to the backlight source driving circuit upon receipt of the first synchronization signal and delay for the buffer duration, the backlight source driving circuit may firstly delay for the buffer duration and then light the light-emitting elements for providing backlight for the liquid crystal display panel. Thus, the problems of afterglow effect and dynamic fuzziness because the backlight source driving circuit provides backlight for the liquid crystal display panel during the process of liquid crystal reversal may be effectively avoided, thereby ensuring the display effect of the display device.

In the embodiment of the present disclosure, one row of light-emitting elements included in the backlight source may correspond to at least one row of pixels, and provide backlight for the at least one row of pixels. Based on this, in order to ensure that the display panel and the backlight source are updated synchronously, a driving direction of the plurality of rows of light-emitting elements should be the same as the scanning direction of the plurality of rows of pixels. Therefore, when sending the driving data of the plurality of rows of light-emitting elements to the backlight source, the control circuit needs to send the driving data of the plurality of rows of light-emitting elements to the backlight source driving circuit according to the scanning direction of the plurality of rows of pixels, such that the backlight source driving circuit drives row by row, according to the order of the received driving data, the plurality of rows of light-emitting elements to emit light and thus each row of light-emitting elements may provide backlight for at least one corresponding row of pixels.

Exemplarily, if the scanning direction of the plurality of rows of pixels is forward scanning, the control circuit may successively send the driving data of the first row of light-emitting elements to the last row of light-emitting elements according to the scanning direction of the plurality of rows of the pixels, such that the backlight source driving circuit drives row by row, according to the received driving data of each row of light-emitting elements, the plurality of rows of light-emitting elements from the first row of light-emitting elements to emit light.

Figure 4:
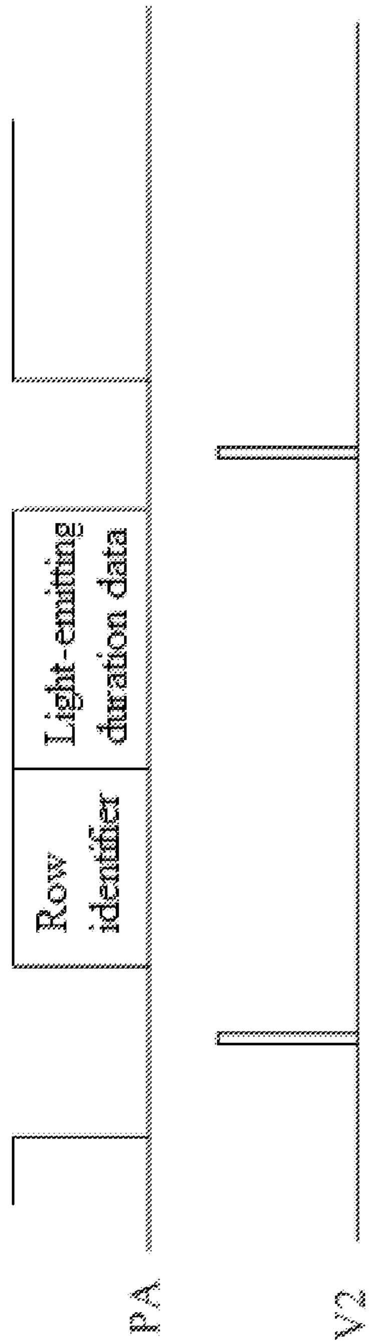
FIG. 4 is a diagram of a data packet according to an embodiment of the present disclosure.

FIG. 4 is a diagram of a data packet according to an embodiment of the present disclosure. With reference to FIG. 4, each data packet PA may include a row identifier of one row of light-emitting elements and driving data of this row of light-emitting elements. Exemplarily, the row identifier may be a row number of one row of light-emitting elements in the plurality of row of light-emitting elements. For example, the row identifier of the first row of light-emitting elements may be 1, and the row identifier of the $N^{th}$ row of light-emitting elements may be N.

The driving data of each row of light-emitting elements may include light-emitting duration data of each light-emitting element in this row of light-emitting elements. Each data packet may be configured to instruct the backlight source driving circuit to drive one row of light-emitting elements, indicated by the row identifier, to emit light, and control a light-emitting duration of the light-emitting element according to the light-emitting duration data of each light-emitting element, and thus control the luminance of emitted light of each light-emitting element. The luminance of emitted light of the light-emitting element is positively correlated with the light-emitting duration. That is, the longer the light-emitting duration is, the higher the luminance of the emitted light of the light-emitting element is.

The light-emitting duration data of each light-emitting element may be a duty ratio of a pulse width modulation (PWM) signal. The backlight source driving circuit may control the current output channel of the light-emitting element to be turned on or off according to the pulse width modulation (PWM) signal with this duty ratio. That is, the backlight source driving circuit may control, when the PWM signal is at an active level, the current output channel to be turned on such that the light-emitting element emits light; and may control, when the PWM signal is at an inactive level, the current output channel to be turned off such that the light-emitting element stops emitting light.

Optionally, the backlight source driving circuit may pre-store the frequency of the PWM signal. The frequency of the PWM signal may be a pre-set fixed frequency and may be greater than a refreshing frequency of the display panel. For example, the frequency of the PWM signal may be a product of the quantity of rows of light-emitting elements included in the backlight source and the refreshing frequency. Exemplarily, it is assumed that the refreshing frequency of the display panel is 100 Hz and the backlight source includes four rows of light-emitting elements, then the frequency of the PWM signal is 400 Hz.

In the embodiment of the present disclosure, the data that is sent to the backlight source driving circuit by the control circuit each time may include a plurality of data packets or one data packet. In one optional implementation mode of the embodiment of the present disclosure, if the control circuit sends M data packets each time and M is an integer greater than 1, the control circuit may further send a driving sequence instruction to the backlight source driving circuit. The driving sequence instruction carries a driving sequence of M rows of light-emitting elements driven through use of the M data packets. The driving sequence instruction is intended to instruct the backlight source driving circuit to drive row by row, according to the driving sequence, the M rows of light-emitting elements to emit light. Optionally, the driving sequence instruction may carry an arrangement order of a plurality of row identifiers of the plurality of rows of light-emitting elements.

For example, if the backlight source includes N rows of light-emitting elements and the control circuit sends two data packets (namely, M is 2) to the backlight source driving circuit each time, in the two data packets sent by the control circuit at the first time, the row identifier of one row of light-emitting elements included in the first data packet is 1 and the row identifier of one row of light-emitting elements included in the second data packet is 2. The driving sequence of the two rows of light-emitting elements carried in the driving sequence instruction that is sent to the backlight source driving circuit by the control circuit is 1 and 2. Upon receipt of the two data packets and the driving sequence instruction, the backlight source driving circuit may firstly drive the first row of light-emitting elements to emit light and then drive the second row of light-emitting elements to emit light.

It should be noted that if the control circuit sends M data packets each time, the quantities of data packets sent by the control circuit at any two times may be the same or different, That is, M is not a fixed value.

In another optional implementation mode of the embodiment of the present disclosure, the control circuit may send one data packet each time. That is, the data sent by the control circuit each time may be configured to drive one row of light-emitting elements to emit light.

For example, if the backlight source includes N rows of light-emitting elements and one data packet is sent each time, the control circuit needs to send data to the backlight source driving circuit at N times. When receiving one data packet each time, the backlight source driving circuit may firstly drive one row of light-emitting elements, indicated by the row identifier in this data packet, to emit light, and control the light-emitting duration of each light-emitting element according to the light-emitting duration data of each light-emitting element in this row of light-emitting elements, such that this row of light-emitting elements provides backlight for at least one corresponding row of pixels.

For example, if the backlight source includes ten rows of light-emitting elements, the control circuit needs to successively send 10 data packets to the backlight source driving circuit. After the control circuit sends one data packet with the row identifier of 1 to the backlight source driving circuit, the backlight source driving circuit may drive, based on the row identifier of 1 of this data packet, the first row of light-emitting elements to emit light, such that the first row of light-emitting elements provides backlight for at least one corresponding row of pixels.

In the embodiment of the present disclosure, prior to sending the data to the backlight source driving circuit, the control circuit further needs to send a configuration parameter to the backlight source driving circuit. The configuration parameter may include the value of the maximum current that may be carried by the plurality of rows of light-emitting elements, such that the backlight source driving circuit may set, based on the value of the maximum current, the value of the maximum voltage that may be carried by the backlight source driving circuit.

It should be noted that step 303 and the operation of the timer in step 305 may be performed at the same time.

In step 306, after at least one data packet is sent each time, a second synchronization signal that is sent by a scanning driving circuit at an interval of a scanning duration is received.

In the embodiment of the present disclosure, the display device may further include the scanning driving circuit. The scanning driving circuit is connected to the control circuit and each row of pixels, and is configured to scan row by row various rows of pixels according to a pre-set scanning direction. Scanning of one row of pixels may refer to provision of a gate driving signal for this row of pixels. It can be seen from the above description that each row of light-emitting elements corresponds to at least one row of pixels, and each row of light-emitting elements may provide backlight for at least one corresponding row of pixels. The scanning driving circuit may send a second synchronization signal to the control circuit after scanning at least one row of pixels corresponding to one row of light-emitting elements each time. Therefore, the scanning duration is a duration required for the scanning driving circuit to scan at least one row of pixels corresponding to one row of light-emitting elements.

Exemplarily, it is assumed that one row of light-emitting elements in the backlight source corresponds to ten rows of pixels in the display panel, then the scanning driving circuit may send a second synchronization signal to the control circuit after scanning the first row of pixels to the tenth row of pixels. The scanning driving circuit may send a second synchronization signal to the control circuit again after scanning the eleventh row of pixels to the twentieth row of pixels, and by such analogy until the scanning driving circuit scans all the pixels.

In the embodiment of the present disclosure, the display device may further include a source driving circuit. The source driving circuit may provide grayscale data for each column of pixels in the process that the scanning driving circuit drives row by row the pixels. Optionally, the source driving circuit may compensate the grayscale data in the process of liquid crystal reversal according to the driving data of the corresponding light-emitting element to obtain the compensated grayscale data, and send the compensated grayscale data to the various columns of pixels.

In step 307, after the second synchronization signal is received each time, a third synchronization signal is sent to the backlight source driving circuit.

The third synchronization signal is intended to instruct the backlight source driving circuit to drive one row of light-emitting element to emit light.

Upon receipt of the second synchronization signal sent by the scanning driving circuit, the control circuit may send a third synchronization signal to the backlight source driving circuit, such that the backlight source driving circuit drives, based on the data packet, one row of light-emitting elements corresponding to at least one row of pixels to emit light.

Exemplarily, it is assumed that the backlight source includes N rows of light-emitting elements, each row of light-emitting elements corresponding to K rows of pixels, and the control circuit sends M data packets each time, wherein K is an integer greater than 1. After scanning the first row of pixels to the $K^{th}$ row of pixels, the scanning driving circuit may send a first second synchronization signal to the control circuit. Upon receipt of the first second synchronization signal, the control circuit may send a first third synchronization signal to the backlight source driving circuit. Upon receipt of the first third synchronization signal, the backlight source driving circuit may drive, according to the driving sequence, one row of light-emitting elements, indicated by the first data packet in the plurality of data packets, to emit light, such that this row of light-emitting elements provides backlight for the first row of pixels to the $K^{th}$ row of pixels.

Hereafter, after scanning the $(K+1)^{th}$ row of pixels to the $2K^{th}$ row of pixels, the scanning driving circuit may send the second synchronization signal to the control circuit. Upon receipt of the second synchronization signal, the control circuit may send second third synchronization signal to the backlight source driving circuit. Upon receipt of the second third synchronization signal, the backlight source driving circuit may drive, according to the driving sequence, one row of light-emitting elements, indicated by the second data packet in the plurality of data packets, to emit light, such that this row of light-emitting elements provide backlight for the $(K+1)^{th}$ row of pixels to the $2K^{th}$ row of pixels. By such analogy, until the scanning driving circuit scans the plurality of rows of pixels included in the display panel.

It is assumed that the backlight source includes N rows of light-emitting elements, each row of light-emitting elements corresponding to K rows of pixels, and the control circuit sends one data packet each time. After scanning the first row of pixels to the $K^{th}$ rows of pixels, the scanning driving circuit may send a second synchronization signal to the control circuit. Upon receipt of the second synchronization signal, the control circuit may send a third synchronization signal to the backlight source driving circuit. Upon receipt of the third synchronization signal, the backlight source driving circuit may drive one row of light-emitting elements, indicated by the row identifier in the data packet, to emit light, such that this row of light-emitting elements provide backlight for the first row of pixels to the $K^{th}$ rows of pixels. By such analogy, until the scanning driving circuit scans the plurality of rows of pixels included in the display panel. That is, the scanning driving circuit needs to send the second synchronization signal to the control circuit at N times and correspondingly, the control circuit needs to send the third synchronization signal to the backlight source driving circuit at N times.

In the embodiment of the present disclosure, the control circuit may send the driving data and the third synchronization signal to the backlight source driving circuit at the same time, or firstly send the driving data and then send the third synchronization signal, or firstly send the third synchronization signal and then send the driving data, which is not limited in the embodiment of the present disclosure.

Figure 5:
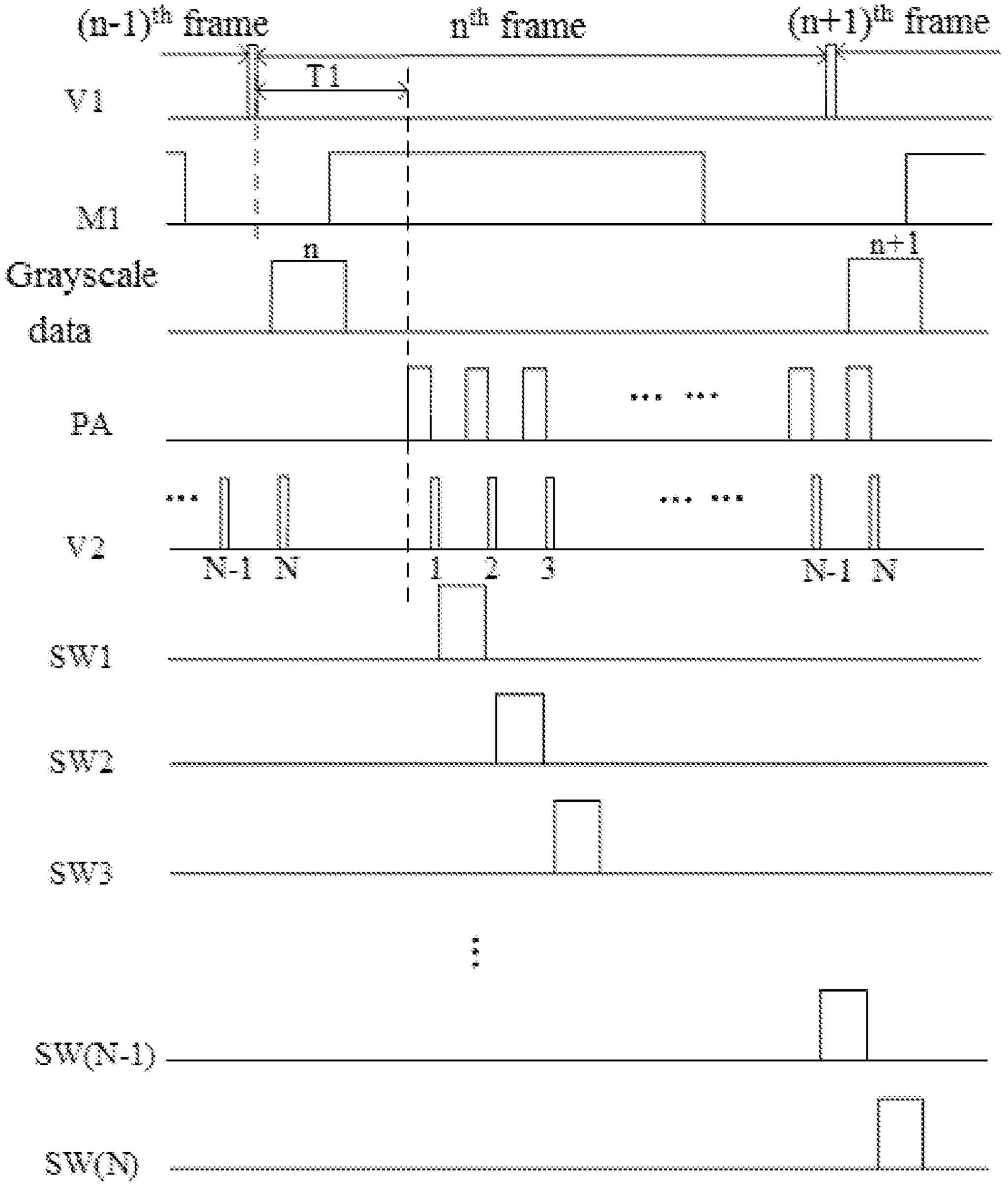
FIG. 5 is a sequence diagram of a method for sending driving data of a backlight source according to an embodiment of the present disclosure.

FIG. 5 is a sequence diagram of a method for sending driving data of a backlight source according to an embodiment of the present disclosure. As shown in FIG. 5, it is assumed that when the display panel starts to display the $n^{th}$ frame image, the control circuit receives the first synchronization signal V1 sent by the image processing circuit, and starts to receive the grayscale data of the $N^{th}$ frame image, which is sent by the image processing circuit, upon receipt of the first synchronization signal V1. The control circuit may parse the received grayscale data, and send a first data packet PA to the backlight source driving circuit after the buffer duration T1. N is an integer greater than 1.

Hereafter, the control circuit may receive the second synchronization signal V2 sent by the scanning driving circuit, and send the third synchronization signal V3 to the backlight source driving circuit. Upon receipt of the third synchronization signal V3; and the backlight source driving circuit may send an ON signal SW1 to one row of light-emitting elements indicated by the row identifier in the first data packet, i.e., provide a driving voltage for the first row of light-emitting elements, and drive this row of light-emitting elements to emit light.

Hereafter, a second data packet PA is sent to the backlight source driving circuit, and after the second synchronization signal V2 sent by the scanning driving circuit is received, a third synchronization signal V3 is sent to the backlight source driving circuit again. Upon receipt of the third synchronization signal V3, the backlight source driving circuit may send an ON signal SW2 to one row of light-emitting elements indicated by the row identifier in the second data packet, i.e., provide a driving voltage for the second row of light-emitting elements, and drives this row of light-emitting elements to emit light. By such analogy, when receiving the third synchronization signal V3 each time, the backlight source driving circuit may send the corresponding ON signal to one corresponding row of light-emitting elements, and thus drive the corresponding row of light-emitting elements to emit light.

Figure 6:
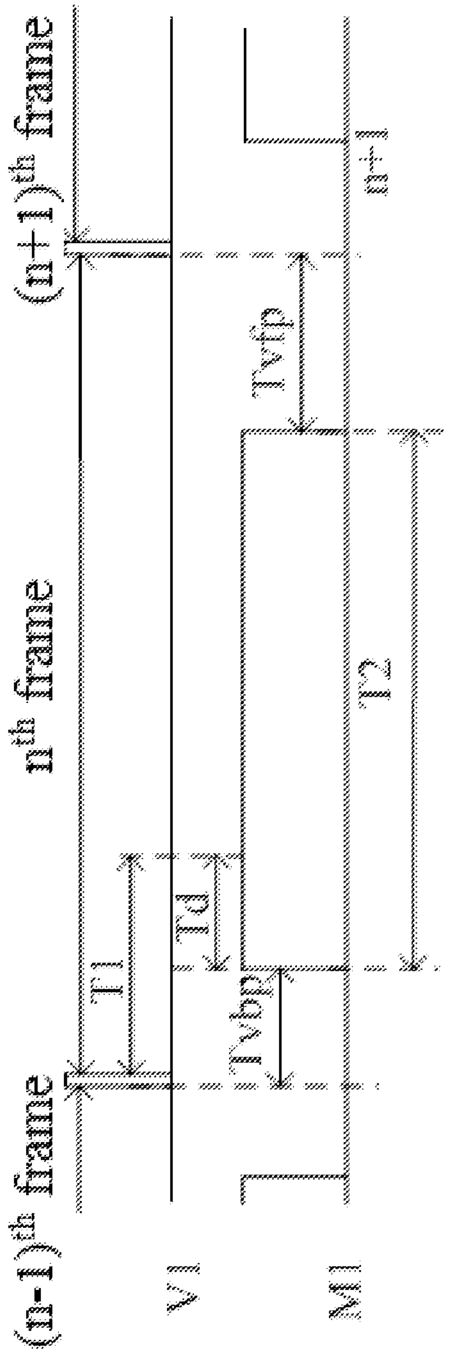
FIG. 6 is a sequence diagram when a display panel according to an embodiment of the present disclosure displays one frame image.

FIG. 6 is a sequence diagram when a display panel according to an embodiment of the present disclosure displays one frame image. As shown in FIG. 6, the time M1 when the display panel displays one frame image may include back porch blanking time Tvbp, liquid crystal driving and scanning time T2 and front porch blanking time Tvfp. T1 is the buffer duration, and may be greater than or equal to the sum of the duration of the back porch blanking time Tvbp and a duration Td required for liquid crystals to be in a stable state from starting of reverse.

In the embodiment of the present disclosure, if the display device is a VR display device or an AR display device, two display panels which correspond to the left eye and the right eye respectively may be arranged in the display device. Correspondingly, the backlight source in the display device may include two light-emitting element arrays corresponding to the two display panels respectively. Each light-emitting element array may be driven by one backlight source driving circuit. Compared with the related art, in which each column of light-emitting elements in each light-emitting element array needs to be driven by one backlight source driving circuit, the solution according to the embodiment of the present disclosure may effectively reduce the quantity of backlight source driving circuits which need to be arranged in the display device, and thus reduce the design area of the circuit and the physical space of the display device.

By adopting the solution according to the embodiment of the present disclosure, the driving sequence of the plurality of rows of light-emitting elements in the backlight source may be adjusted freely according to the scanning direction of the plurality of rows of pixels included in the display panel on the premise of not changing the size of the display device, thereby avoiding repeated design of the backlight source driving circuit and reducing the cost. Optionally, the control circuit may adjust the sending order of the data packets according to the scanning direction of the plurality of rows of pixels, and thus change the driving sequence of the plurality of rows of light-emitting elements.

It should be noted that the order of steps of the method for sending the driving data of the backlight source according to the embodiments of the present disclosure may be adjusted properly and the steps may also be correspondingly increased or decreased according to the situation. For example, step 303 and the operation of the timer in step 305 may be performed at the same time. Other derived methods that would be readily conceived by any person skilled in the art within the technical scope of the present disclosure should be within the scope of protection of the present disclosure, and thus are not described herein.

In summary, in the method for sending the driving data of the backlight source according to the embodiment of the present disclosure, the control circuit may send the driving data of the plurality of rows of light-emitting elements to the backlight source driving circuit at many times and the data sent each time includes at least one data packet, such that the backlight source driving circuit may drive, according to the data packet received each time, the corresponding one row of light-emitting elements to emit light. Since the control circuit may send the data to the backlight source driving circuit at any times and the quantity of data packets sent each time is less than the quantity of rows of light-emitting elements included in the backlight source, the amount of data that is send to the backlight source driving circuit by the control circuit is reduced. Thus, the backlight source driving circuit may firstly drive part of light-emitting elements according to the data packets received each time, thereby reducing the delay when the backlight source driving circuit drives the plurality of light-emitting elements, and ensuring the display effect of the display device.

Figure 7:
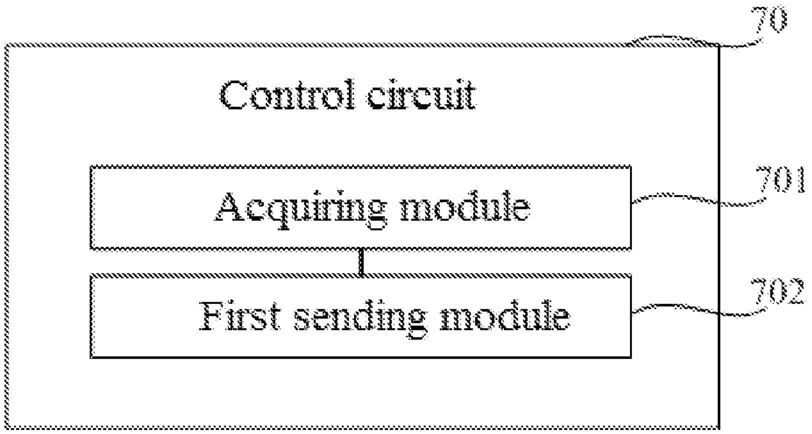
FIG. 7 is a block diagram of a control circuit according to an embodiment of the present disclosure.

FIG. 7 is a block diagram of a control circuit 70 according to an embodiment of the present disclosure. The control circuit 70 may be applied to a display device. The display device may further include a backlight source and a backlight source driving circuit. The backlight source includes a plurality of rows of light-emitting elements. As shown in FIG. 7, the control circuit 70 may include an acquiring module 701 and a first sending module 702.

The acquiring module 701 is configured to acquire driving data of a plurality of rows of light-emitting elements.

The first sending module 702 is configured to send the driving data of the plurality of rows of light-emitting elements to the backlight source driving circuit at many times.

At least one data packet is sent each time, each data packet includes driving data for driving one row of light-emitting elements, and a quantity of data packets sent each time is less than a quantity of rows of light-emitting elements included in the backlight source.

In summary, in the control circuit according to the embodiment of the present disclosure, since the control circuit may send the data to the backlight source driving circuit at many times and the quantity of data packets sent each time is less than the quantity of rows of light-emitting elements included in the backlight source, the amount of data that is sent to the backlight source driving circuit by the control circuit each time is reduced. Thus, the backlight source driving circuit may firstly drive part of light-emitting elements according to the data packets received each time, thereby reducing the delay when the backlight source driving circuit drives the plurality of light-emitting elements, and ensuring the display effect of the display device.

Optionally, the display device further includes a display panel. The display panel includes a plurality of rows of pixels, and each row of light-emitting elements is configured to provide backlight for at least one row of pixels.

The first sending module 702 is further configured to send the driving data of the plurality of rows of light-emitting elements to the backlight source driving circuit at many times according to a scanning direction of the plurality of rows of pixels.

The at least one data packet sent each time is for use by the backlight source driving circuit to drive row by row at least one row of light-emitting elements to emit light.

Figure 8:
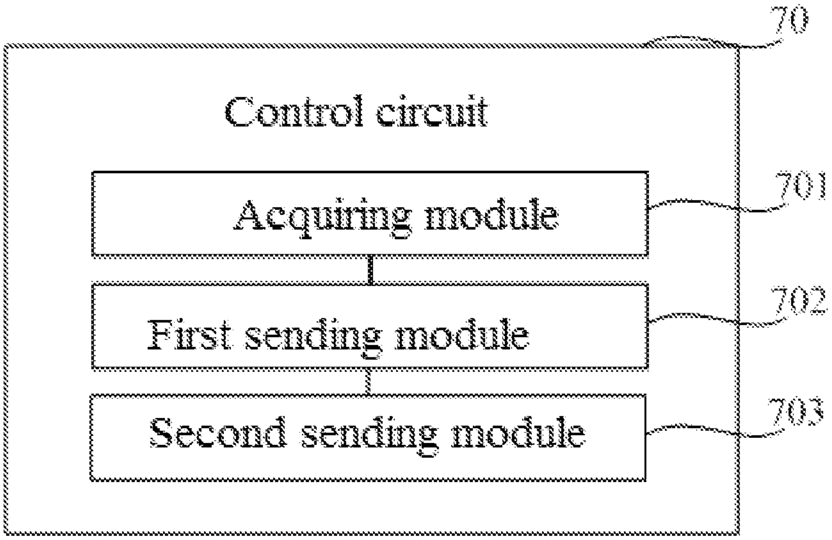
FIG. 8 is a block diagram of another control circuit according to an embodiment of the present disclosure.

Optionally, the control circuit sends M data packets each time. M is an integer greater than 1. As shown in FIG. 8, the control circuit may further include:

a second sending module 703, configured to send a driving sequence instruction to the backlight source driving circuit.

The driving sequence instruction carries a driving sequence of M rows of light-emitting elements driven through use of the M data packets. The driving sequence instruction is intended to instruct the backlight source driving circuit to drive row by row, according to the driving sequence, the M rows of light-emitting elements to emit light.

Figure 9:
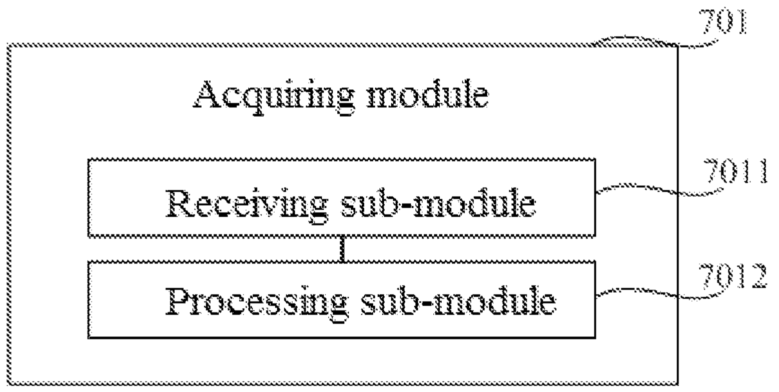
FIG. 9 is a block diagram of an acquiring module according to an embodiment of the present disclosure.

Optionally, as shown in FIG. 1, the display device may further include an image processing circuit 14. As shown in FIG. 9, the acquiring module 701 may include:

a receiving sub-module 7011, configured to receive grayscale data of an image to be displayed which is sent by the image processing circuit; and a processing sub-module 7012, configured to process the grayscale data to obtain driving data of each row of light-emitting elements.

Optionally, the receiving sub-module 7011 is further configured to receive a first synchronization signal sent by the image processing circuit.

The first sending module 702 is further configured to:

upon receipt of the first synchronization signal and delay for a buffer duration, send the driving data of the plurality of rows of light-emitting elements to the backlight source driving circuit at many times.

The buffer duration may be greater than or equal to a duration of a time period from the time when the image processing circuit sends the first synchronization signal to the time when liquid crystals are reversed to be in a stable state when the display panel displays the image to be displayed.

Optionally, the display device further includes a scanning driving circuit. The scanning driving circuit is connected to the control circuit and each row of pixels, and each row of light-emitting elements is configured to provide backlight for at least one corresponding row of pixels.

Figure 10:
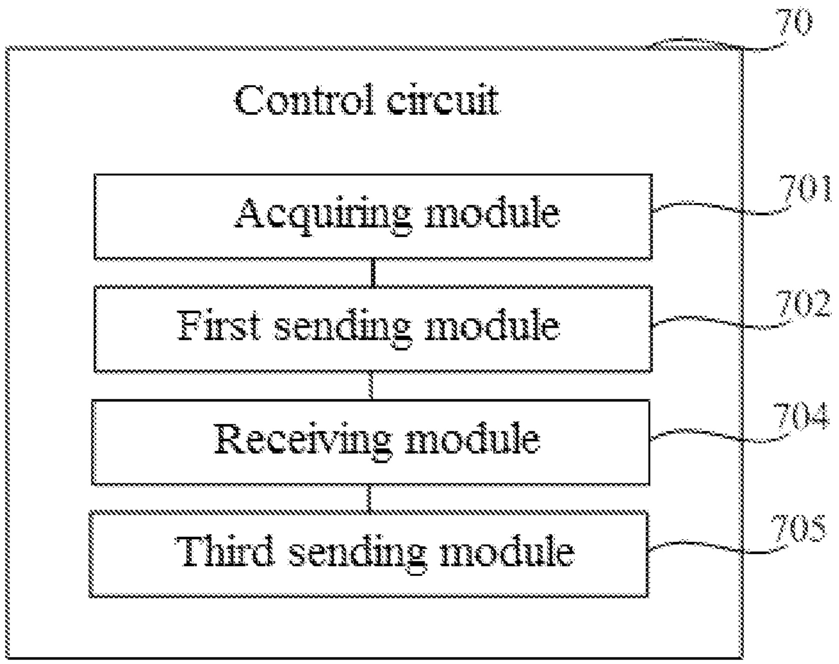
FIG. 10 is a block diagram of still another control circuit according to an embodiment of the present disclosure.

As shown in FIG. 10, the control circuit may further include:

a receiving module 704, configured to: after at least one data packet is sent each time, receive a second synchronization signal which is sent by the scanning driving circuit of the display panel at an interval of a scanning duration, wherein the scanning duration is a duration required for the scanning driving circuit to scan the at least one row of pixels; and a third sending module 705, configured to send a third synchronization signal to the backlight source driving circuit, wherein the third synchronization signal is intended to instruct the backlight source driving circuit to drive one row of light-emitting elements to emit light.

In summary, in the control circuit according to the embodiment of the present disclosure, since the control circuit may send the data to the backlight source driving circuit at many times and the quantity of data packets sent each time is less than the quantity of rows of light-emitting elements included in the backlight source, the amount of data that is sent to the backlight source driving circuit by the control circuit each time is reduced. Thus, the backlight source driving circuit may firstly drive part of light-emitting elements according to the data packets received each time, thereby reducing the delay when the backlight source driving circuit drives the plurality of light-emitting elements, and ensuring the display effect of the display device.

Figure 11:
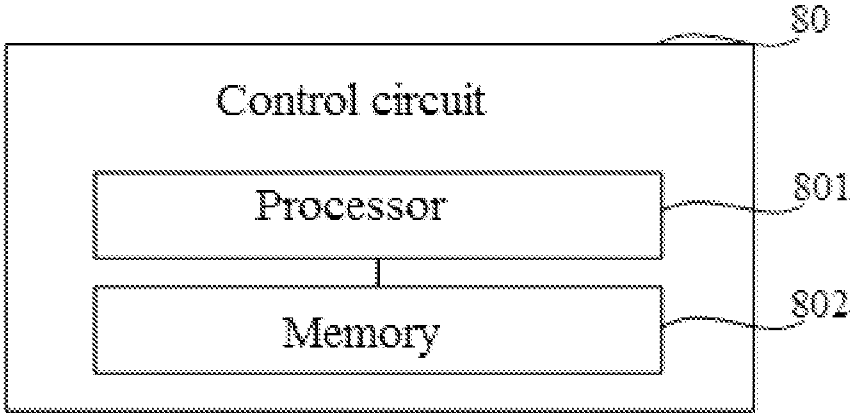
FIG. 11 is a structural diagram of yet still another control circuit according to an embodiment of the present disclosure.

FIG. 11 is a structural diagram of yet still another control circuit according to an embodiment of the present disclosure. As shown in FIG. 11, the control circuit may include a memory, a processor, and a computer program stored on the memory. When executing the computer program, the processor may perform the method for sending the driving data of the backlight source according to the above method embodiment, such as the method for sending the driving data of the backlight source shown in FIG. 2 or FIG. 3.

An embodiment of the present disclosure provides a computer-readable storage medium having at least one instruction stored therein. When running on a computer, the computer-readable storage medium causes the computer to perform the method for sending the driving data of the backlight source according to the above method embodiment, such as the method for sending the driving data of the backlight source shown in FIG. 2 or FIG. 3.

An embodiment of the present disclosure provides a display device. As shown in FIG. 1, the display device may include a control circuit 11, a backlight source 12 and a backlight source driving circuit 13. The control circuit 12 may be any of the control circuits shown in FIGS. 7 to 11.

Optionally, the display device may further include an image processing circuit 14. The image processing circuit 14 is connected to the control circuit 11, and is configured to process an image to be displayed to obtain grayscale data of the image to be displayed, and send the grayscale data of the image to be displayed to the control circuit 11.

The display device may further include a display panel. The backlight source 12 is configured to provide backlight for the display panel. The display panel may be a liquid crystal display panel.

Optionally, the display device may be a virtual reality display device or an augmented reality display device. The display device may be any product or component having a display function, such as a liquid crystal display device, electronic paper, a mobile phone, a tablet computer, a television, a display, a laptop computer, a digital photo frame and a navigator.

Described above are merely exemplary embodiments of the present disclosure, and are not intended to limit the present disclosure. Within the spirit and principles of the disclosure, any modifications, equivalent substitutions, improvements or the like are within the protection scope of the present disclosure.

What is claimed is:

1. A method for sending driving data of a backlight source, wherein the backlight source comprises a plurality of rows of light-emitting elements, and the method comprises:

acquiring driving data of the plurality of rows of light-emitting elements; and sending the driving data of the plurality of rows of light-emitting elements to a driving circuit of the backlight source at many times;

wherein at least one data packet is sent each time, each of the at least one data packet comprises driving data for driving one row of light-emitting elements, and a quantity of data packets sent each time is less than a quantity of rows of light-emitting elements included in the backlight source;

acquiring the driving data of the plurality of rows of light-emitting elements comprises:

receiving a first synchronization signal sent by the image processing circuit;

receiving grayscale data of an image to be displayed which is sent by an image processing circuit; and processing the grayscale data to obtain driving data of each of the light-emitting elements in the plurality of rows of light-emitting elements; and sending the driving data of the plurality of rows of light-emitting elements to a driving circuit of the backlight source at many times comprises:

upon receipt of the first synchronization signal and delay for a buffer duration, sending the driving data of the plurality of rows of light-emitting elements to the driving circuit of the backlight source at many times.

2. The method according to claim 1, wherein each row of light-emitting elements is configured to provide backlight for at least one row of pixels in a plurality of rows of pixels included in a display panel; and sending the driving data of the plurality of rows of light-emitting elements to the driving circuit of the backlight source at many times comprises:

sending the driving data of the plurality of rows of light-emitting elements to the driving circuit of the backlight source at many times according to a scanning direction of the plurality of rows of pixels;

wherein the at least one data packet sent each time is for use by the driving circuit of the backlight source to drive row by row at least one row of the light-emitting elements to emit light.

3. The method according to claim 1, wherein each of the at least one data packet further comprises a row identifier of the one row of light-emitting elements, and the driving data for driving one row of light-emitting elements comprises light-emitting duration data of each of the light-emitting elements in the one row of the light-emitting elements; and each of the at least one data packet is intended to instruct the driving circuit of the backlight source to drive one row of light-emitting elements, indicated by the row identifier, to emit light, and control a light-emitting duration of the light-emitting element according to the light-emitting duration data of each of the light-emitting elements.

4. The method according to claim 1, wherein M data packets are sent each time, M being an integer greater than 1; and the method further comprises:

sending a driving sequence instruction to the driving circuit of the backlight source, wherein the driving sequence instruction carries a driving sequence of M rows of light-emitting elements driven through use of the M data packets, and is intended to instruct the driving circuit of the backlight source to drive row by row, according to the driving sequence, the M rows of light-emitting elements to emit light.

5. The method according to claim 1, wherein one data packet is sent each time.

6. The method according to claim 1, wherein the buffer duration is greater than or equal to a duration of a time period from the time when the image processing circuit sends the first synchronization signal to the time when liquid crystals are reversed to be in a stable state when the display panel displays the image to be displayed.

7. The method according to claim 1, wherein each row of light-emitting elements is configured to provide backlight for at least one row of pixels in a plurality of rows of pixels included in a display panel;

after the at least one data packet is sent each time, the method further comprises:

receiving a second synchronization signal which is sent by a scanning driving circuit of the display panel at an interval of a scanning duration, wherein the scanning duration is a duration required for the scanning driving circuit to scan the at least one row of pixels; and upon receipt of the second synchronization signal each time, sending a third synchronization signal to the driving circuit of the backlight source, wherein the third synchronization signal is intended to instruct the driving circuit of the backlight source to drive one row of light-emitting elements to emit light.

8. The method according to claim 6, wherein each row of light-emitting elements is configured to provide backlight for at least one row of pixels in a plurality of rows of pixels included in a display panel; and sending the driving data of the plurality of rows of light-emitting elements to a driving circuit of the backlight source at many times comprises:

sending the driving data of the plurality of rows of light-emitting elements to the driving circuit of the backlight source at many times according to a scanning direction of the plurality of rows of pixels, wherein M data packets are sent each time, M being an integer greater than 1;

the method further comprises:

sending a driving sequence instruction to the driving circuit of the backlight source, wherein the driving sequence instruction carries a driving sequence of M rows of light-emitting elements driven through use of the M data packets, and is intended to instruct the driving circuit of the backlight source to drive row by row, according to the driving sequence, the M rows of light-emitting elements to emit light; and after the M data packets are sent each time, the method further comprises:

receiving a second synchronization signal which is sent by a scanning driving circuit of the display panel at an interval of a scanning duration, wherein the scanning duration is a duration required for the scanning driving circuit to scan the at least one row of pixels; and upon receipt of the second synchronization signal each time, sending a third synchronization signal to the driving circuit of the backlight source, wherein the third synchronization signal is intended to instruct the driving circuit of the backlight source to drive one row of light-emitting elements in the M rows of light-emitting elements to emit light.

9. A control circuit, comprising: a memory, a processor and a computer program stored on the memory, wherein when executing the computer program, the processor performs the following operations:

acquiring driving data of a plurality of rows of light-emitting elements included in a backlight source; and sending the driving data of the plurality of rows of light-emitting elements to a driving circuit of the backlight source at many times;

wherein at least one data packet is sent each time, each of the at least one data packet comprises driving data for driving one row of light-emitting elements, and a quantity of data packets sent each time is less than a quantity of rows of light-emitting elements included in the backlight source;

acquiring the driving data of the plurality of rows of light-emitting elements comprises:

receiving a first synchronization signal sent by the image processing circuit;

receiving grayscale data of an image to be displayed which is sent by an image processing circuit; and processing the grayscale data to obtain driving data of each of the light-emitting elements in the plurality of rows of light-emitting elements; and sending the driving data of the plurality of rows of light-emitting elements to a driving circuit of the backlight source at many times comprises:

upon receipt of the first synchronization signal and delay for a buffer duration, sending the driving data of the plurality of rows of light-emitting elements to the driving circuit of the backlight source at many times.

10. The control circuit according to claim 9, wherein each row of light-emitting elements is configured to provide backlight for at least one row of pixels in a plurality of rows of pixels included in a display panel; and when executing the computer program, the processor performs the following operation:

sending the driving data of the plurality of rows of light-emitting elements to the driving circuit of the backlight source at many times according to a scanning direction of the plurality of rows of pixels;

wherein the at least one data packet sent each time is for use by the driving circuit of the backlight source to drive row by row at least one row of the light-emitting elements to emit light.

11. The control circuit according to claim 9, wherein each of the at least one data packet further comprises a row identifier of the one row of light-emitting elements, and the driving data for driving one row of light-emitting elements comprises light-emitting duration data of each of the light-emitting elements in the one row of light-emitting elements; and each of the at least one data packet is intended to instruct the driving circuit of the backlight source to drive one row of light-emitting elements, indicated by the row identifier, to emit light, and control a light-emitting duration of the light-emitting element according to the light-emitting duration data of each of the light-emitting elements.

12. The control circuit according to claim 9, wherein M data packets are sent each time and M is an integer greater than 1; and when executing the computer program, the processor performs the following operation:

sending a driving sequence instruction to the driving circuit of the backlight source;

wherein the driving sequence instruction carries a driving sequence of M rows of light-emitting elements driven through use of the M data packets, and is intended to instruct the driving circuit of the backlight source to drive row by row, according to the driving sequence, the M rows of light-emitting elements to emit light.

13. The control circuit according to claim 9, wherein each row of light-emitting elements is configured to provide backlight for at least one row of pixels in a plurality of rows of pixels included in a display panel; and when executing the computer program, the processor performs the following operations:

receiving a second synchronization signal which is sent by a scanning driving circuit of the display panel at an interval of a scanning duration, wherein the scanning duration is a duration required for the scanning driving circuit to scan the at least one row of pixels; and upon receipt of the second synchronization signal each time, sending a third synchronization signal to the driving circuit of the backlight source, wherein the third synchronization signal is intended to instruct the driving circuit of the backlight source to drive one row of light-emitting elements to emit light.

14. A computer-readable storage medium having at least one instruction stored therein, wherein when running on a computer, the computer-readable storage medium causes the computer to perform the method for sending the driving data of the backlight source as defined in claim 1.

15. A display device, comprising a backlight source, a driving circuit of the backlight source, and a control circuit; wherein the backlight source comprises a plurality of rows of light-emitting elements, and the control circuit comprises a memory, a processor and a computer program stored on the memory, wherein when executing the computer program, the processor performs the following operations:

acquiring driving data of the plurality of rows of light-emitting elements; and sending the driving data of the plurality of rows of light-emitting elements to a driving circuit of the backlight source at many times;

wherein at least one data packet is sent each time, each of the at least one data packet comprises driving data for driving one row of light-emitting elements, and a quantity of data packets sent each time is less than a quantity of rows of light-emitting elements included in the backlight source;

acquiring the driving data of the plurality of rows of light-emitting elements comprises:

receiving a first synchronization signal sent by the image processing circuit;

receiving grayscale data of an image to be displayed which is sent by an image processing circuit; and processing the grayscale data to obtain driving data of each of the light-emitting elements in the plurality of rows of light-emitting elements; and sending the driving data of the plurality of rows of light-emitting elements to a driving circuit of the backlight source at many times comprises:

upon receipt of the first synchronization signal and delay for a buffer duration, sending the driving data of the plurality of rows of light-emitting elements to the driving circuit of the backlight source at many times.

16. The display device according to claim 15, wherein the display device is a virtual reality display device or an augmented reality display device.

17. The display device according to claim 15, wherein each row of light-emitting elements is configured to provide backlight for at least one row of pixels in a plurality of rows of pixels included in the display device; and sending the driving data of the plurality of rows of light-emitting elements to the driving circuit of the backlight source at many times comprises:

sending the driving data of the plurality of rows of light-emitting elements to the driving circuit of the backlight source at many times according to a scanning direction of the plurality of rows of pixels;

wherein the at least one data packet sent each time is for use by the driving circuit of the backlight source to drive row by row at least one row of the light-emitting elements to emit light.

18. The display device according to claim 15, wherein each of the at least one data packet further comprises a row identifier of the one row of light-emitting elements, and the driving data for driving one row of light-emitting elements comprises light-emitting duration data of each of the light-emitting elements in the one row of the light-emitting elements; and each of the at least one data packet is intended to instruct the driving circuit of the backlight source to drive one row of light-emitting elements, indicated by the row identifier, to emit light, and control a light-emitting duration of the light-emitting element according to the light-emitting duration data of each of the light-emitting elements.

19. The display device according to claim 15, wherein the buffer duration is greater than or equal to a duration of a time period from the time when the image processing circuit sends the first synchronization signal to the time when liquid crystals are reversed to be in a stable state when the display panel displays the image to be displayed.

20. The display device according to claim 15, wherein each row of light-emitting elements is configured to provide backlight for at least one row of pixels in a plurality of rows of pixels included in the display device; and when executing the computer program, the processor performs the following operations:

receiving a second synchronization signal which is sent by a scanning driving circuit of the display panel at an interval of a scanning duration, wherein the scanning duration is a duration required for the scanning driving circuit to scan the at least one row of pixels; and upon receipt of the second synchronization signal each time, sending a third synchronization signal to the driving circuit of the backlight source, wherein the third synchronization signal is intended to instruct the driving circuit of the backlight source to drive one row of light-emitting elements to emit light.

* * * * *